(No Model.)
W. J. FAUL.
LUBRICATOR FOR LOOSE PULLEYS.
No. 309,614. Patented Dec. 23, 1884.
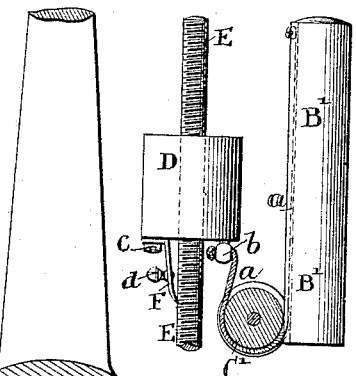
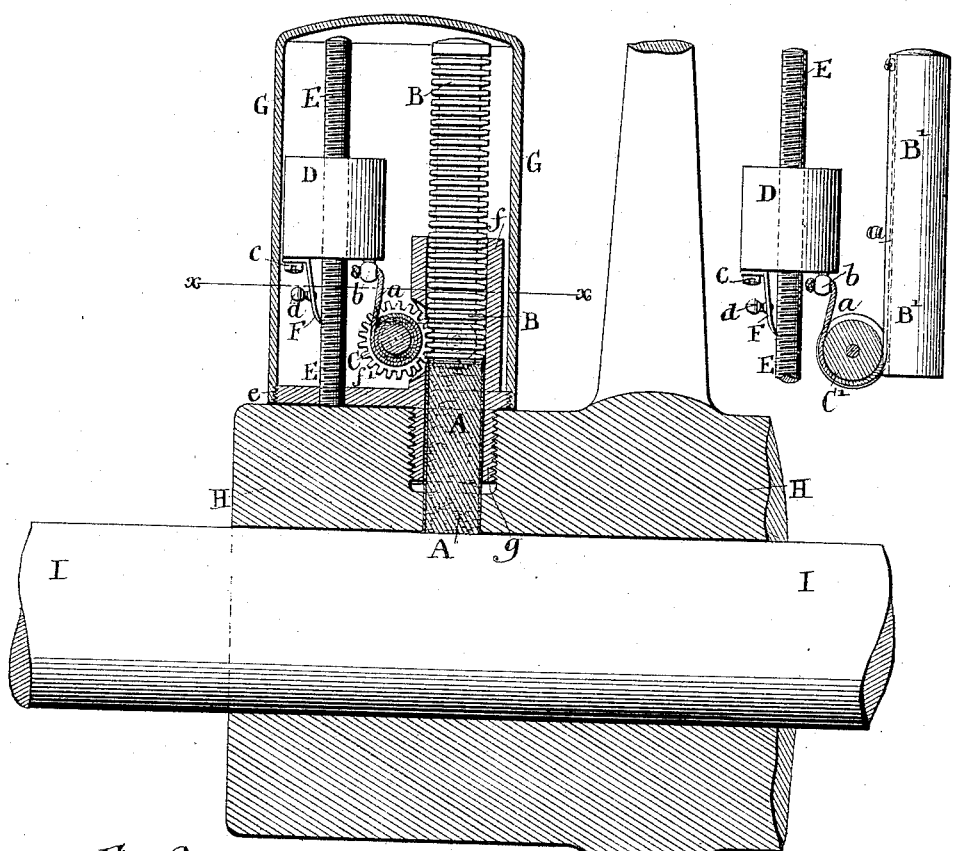
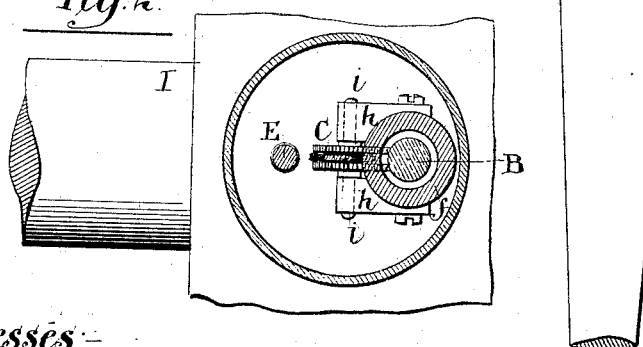
Witnesses:-
Louis M. F. Whitehead.
C. E. Sundgren.
Inventor:-
Wm. J. Faul
By his Attys,
Brown & Hall

UNITED STATES PATENT OFFICE.

WILLIAM J. FAUL, OF NEW YORK, N. Y.

LUBRICATOR FOR LOOSE PULLEYS.

SPECIFICATION forming part of Letters Patent No. 309,614, dated December 23, 1884.

Application filed July 15, 1884. (No model.)

*To all whom it may concern:*

Be it known that I, WILLIAM J. FAUL, a citizen of the United States, and a resident of the city and county of New York and State of New York, have invented a new and useful Improvement in Lubricators for Loose Pulleys, &c., of which the following is a specification, reference being had to the accompanying drawings.

The invention relates more particularly to the lubrication of loose pulleys, or of those kinds of mechanism wherein the centrifugal force of their revolution is apt to throw the lubricating material away from the shaft or part to be lubricated.

The improvement is more especially adapted to the use of a solid lubricant in the form of a stick or of a cartridge, such as is the subject of my Patent No. 214,640, dated April 22, 1879, though it may be adapted to use with a liquid lubricant.

The invention consists, essentially, in the combination, with a case for containing the lubricating material, of a plunger or follower fitted to said case, a centrifugal weight capable of developing greater centrifugal force than the grease and the follower, a pulley or wheel, and a cord or chain running on said pulley or wheel and serving to produce the operation of said plunger or follower by said weight, as will be more fully hereinafter described, whereby the centrifugal force of said weight may be caused to feed or force the grease from said case into contact with the shaft or surface to be lubricated.

Figure 1 is a vertical sectional view of a lubricating apparatus constructed according to my invention, and of parts of a loose pulley and shaft to which said apparatus is applied. Fig. 2 is a transverse sectional view of the same on the line *x x* of Fig. 1. Fig. 3 is a view of a modification of my invention.

Similar letters of reference denote corresponding parts in all the figures.

*f g* designate the case which contains the lubricating material, which is represented in the form of a stick or cartridge of such size as to be free to move lengthwise in the said case, which is open both at its inner and outer ends.

B of Figs. 1 and 2 is the plunger or follower, which may be made of wood or some other light material, and which works freely lengthwise in said case. This may be constructed or provided with a toothed rack of any convenient form, so that it will engage the pinion-wheel C, which will be presently described. In the example given it is illustrated as a cylindrical rack, that form seeming preferable. The case *f g* may be fastened in any convenient manner, as by a screw-thread on a portion of its exterior, into the hub H of a loose pulley or other rotating piece of mechanism, as illustrated at *g*.

The toothed pinion-wheel C is mounted on an axle, *i*, in suitable bearings, *h h*, formed upon or secured to the case *f g*, and it gears with the teeth of the plunger or follower B. This wheel C has a deep groove provided in it, so as to form a sheave for the cord *a*. This cord, which is fastened by one end to the sheave or wheel C, and, being wound around it, is fastened by the other end to the weight D at *b*, may be replaced with a chain, if it be found desirable. The weight D, which is to be made of metal or some heavy material, that it may be capable of developing a greater amount of centrifugal force than that developed in the grease and the follower, is mounted so that it is free to slide on a guide, E. The weight and guide may be of any convenient form. In the example given they are illustrated as being cylindrical, the guide having cut upon it a screw-thread to form a rack for a detent, F, attached to the weight D. The inner end of this guide or rack E is firmly secured in the flange *f'* of the case *f g*. On the lower end of the weight D, at *c*, is fastened the detent F, which works as a pawl in the rack E. This detent is provided with a convenient handle at *d*. Over all this apparatus is placed a convenient cover, (designated by G,) which may be screwed on the flange *f'* of the case *f g* at *e e;* or it may be fastened in any other convenient way.

H designates the hub of a loose pulley.

I designates the shaft upon which the loose pulley H runs.

Fig. 3 illustrates a modification of my invention, in which, instead of the plunger or follower B' being a rack, it is a plain cylinder, and instead of the wheel C' being a toothed pinion, it is a smooth sheave-pulley. The cord or chain $a$ is in this example attached by one end to the weight D, and, passing partly around the sheave-pulley C', is fastened by its other end to the top of the cylindrical plunger or follower B', so that the outward motion of the weight D will produce a corresponding inward movement of the plunger or follower B'. The cord is represented as working in a longitudinal groove provided in the follower B'.

To use my lubricator, it is attached, as hereinbefore described, to the hub of a loose pulley or other rapidly-revolving mechanism, preferably in such manner that the axial line of the said case $f$ $g$ and the axis of the rack E will be in a plane radial to the center of motion of said loose pulley or other mechanism. The grease stick or cartridge A is placed in the case $f$ $g$, with its inner end resting against the shaft to be lubricated. The follower or plunger B is also placed in said case, so that its inner end will rest on the outer end of said grease stick or cartridge, and the teeth of its inner end mesh into the teeth of the pinion C. The weight D is placed near the inner end of the rack E, and the cord $a$ wound up upon the sheave of the wheel C, so that the portion between the said wheel and the weight D will be taut, and so that the unwinding of said cord will turn said wheel in the proper direction to push the said plunger or follower inwardly into the case $f$ $g$ and against the outer end of the said grease stick or cartridge. If the pulley or other mechanism be then set in motion, it will be found that, on account of the greater centrifugal force developed in the weight D as compared with that developed in the grease and in the plunger or follower B, the weight will be continually inclined to move outward on the rack E, and at the same time to produce an inward motion of the plunger or follower B. As the grease stick or cartridge is consumed by lubrication and gradually grows shorter and shorter, the plunger or follower will be constantly carried inward against it, and continuously press it against the journal as the weight D gradually creeps outward on the rack E. The detent F, which works as a pawl in the rack E, prevents the weight D from falling or jumping backward on said rack. The cord $a$ being in this way always kept taut, a uniform inward pressure is continuously maintained upon the grease stick or cartridge until it is consumed.

The modification of my invention illustrated in Fig. 3 is used in the same way, except that the cord $a$, being pulled by the motion of the weight D over the pulley C', acts directly upon the upper end of the plunger or follower B' without the intervention of a toothed pinion-wheel.

To adapt a lubricating apparatus substantially such as herein described to the use of a liquid lubricant, the inner end of the case $f$ $g$ would require to be closed, with the exception of a very small orifice for letting the grease pass out, and the plunger or follower would have to be fitted air-tight to the said case.

What I claim, and desire to secure by Letters Patent, is—

1. In a lubricator for loose pulleys and other rapidly-revolving mechanism, the combination, with a case for containing lubricating material, of a follower or plunger capable of being moved in said case to force or feed the lubricating material therefrom, a centrifugal weight, a pulley or wheel, and a cord or chain running on said pulley or wheel for operating said plunger or follower by said weight, substantially as and for the purpose herein described.

2. In a lubricator, the combination, with a case for containing lubricating material, of a plunger or follower provided with a rack and capable of being moved lengthwise in said case for forcing or feeding the lubricating material therefrom, a pinion-wheel attached to said case and gearing into said plunger or follower, a weight and a guide on which it slides, and a cord or chain connecting said weight and said pinion-wheel, substantially as and for the purpose herein described.

3. The combination, with a case for containing lubricating material and a plunger or follower fitted therein, of a pulley or wheel, a centrifugal weight and a rack upon which it moves, a cord working in said pulley or wheel and connecting the plunger or follower and the weight, and a detent attached to said weight and working in said rack, substantially as and for the purpose herein described.

WM. J. FAUL.

Witnesses:
 FREDK. HAYNES,
 EMIL SCHWARTZ.